Feb. 3, 1959  D. C. HEITSHU ET AL  2,871,646
HILLSIDE COMBINE
Filed July 30, 1957  4 Sheets-Sheet 2
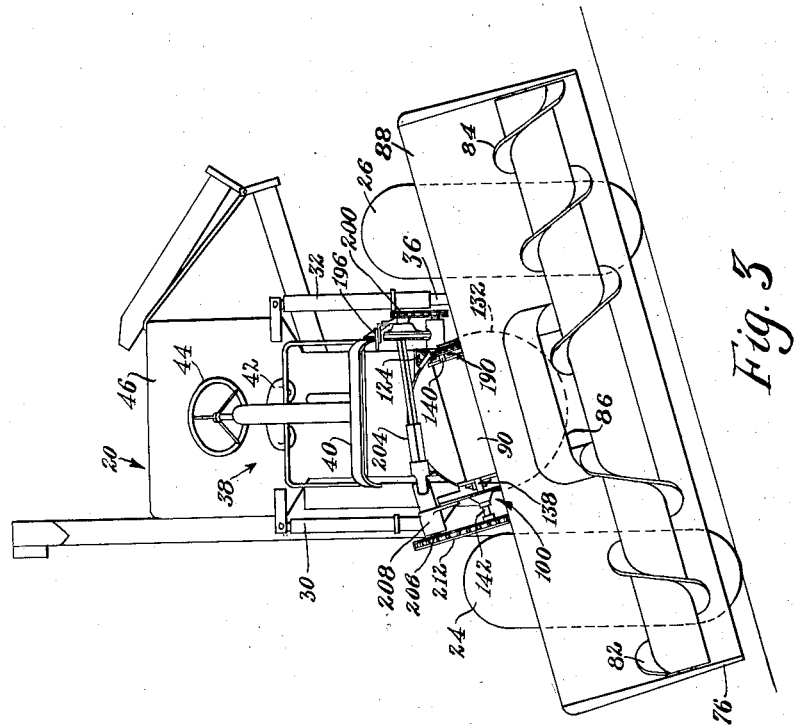
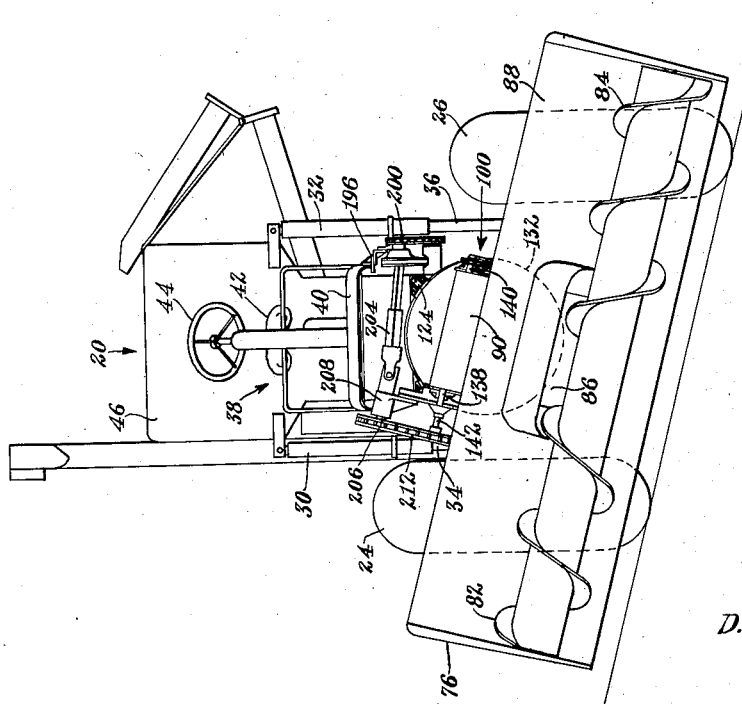
INVENTORS
D. C. Heitshu
B. F. Vogelaar
G. W. Rohweder

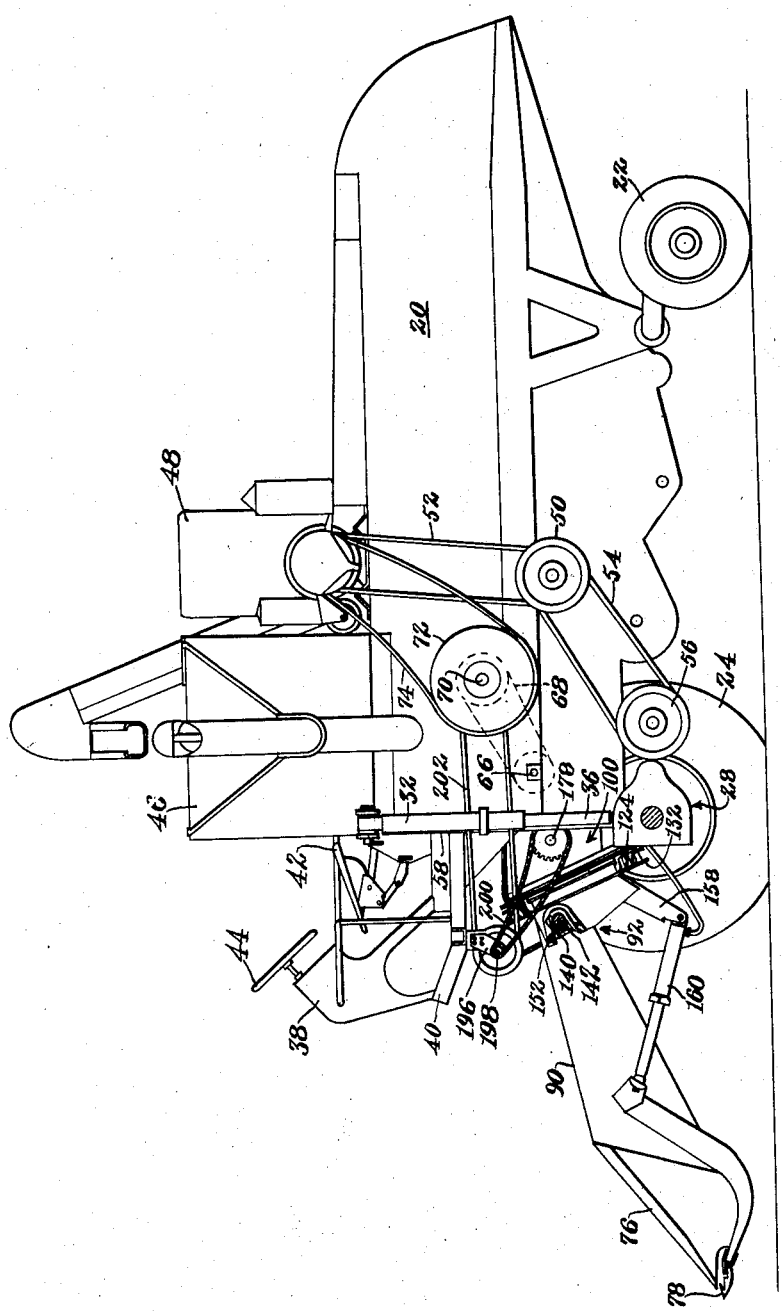

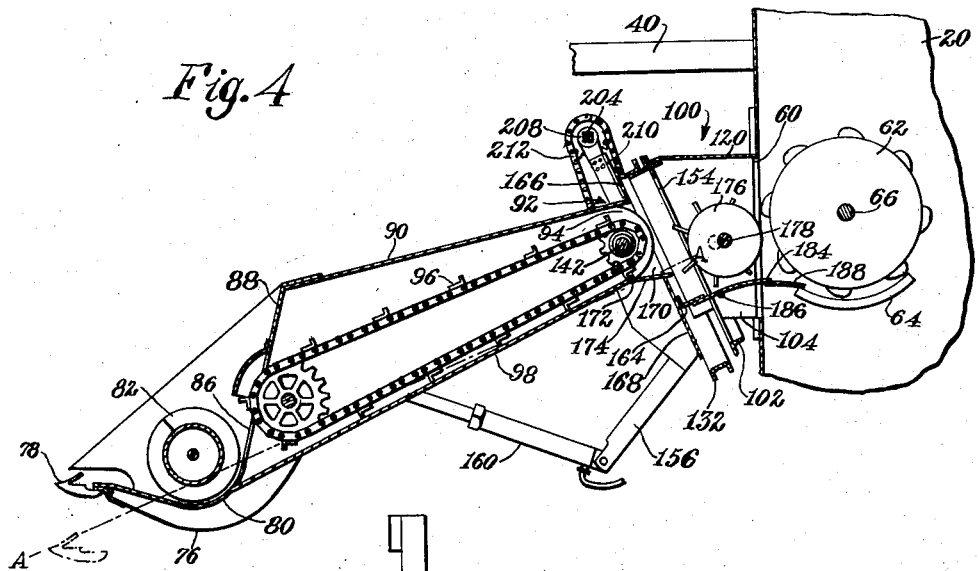

Feb. 3, 1959     D. C. HEITSHU ET AL     2,871,646
HILLSIDE COMBINE

Filed July 30, 1957     4 Sheets-Sheet 4

INVENTORS
D. C. Heitshu
B. F. Vogelaar
G. W. Rohweder

United States Patent Office 2,871,646
Patented Feb. 3, 1959

2,871,646

HILLSIDE COMBINE

Daniel C. Heitshu, Bernard F. Vogelaar, and Glen W. Rohweder, Moline, Ill., assignors, by mesne assignments, to Deere & Company, a corporation of Delaware Application July 30, 1957, Serial No. 675,142

17 Claims. (Cl. 56—209)

This invention relates to a hillside harvester and more particularly to an improved mount for supporting the header on the body or frame so that the header may be readily adapted or controlled to follow side hill slopes while the body remains level.

Machines of the general character referred to are known and patents thereon have been granted on several variations, typical of which are the U. S. patents to Long 2,654,207 and Kroll et al. 2,780,903. What is required in general is the mounting of the header on the front of the combine body for relative turning about a fore-and-aft axis lying substantially in the longitudinal median plane of the machine, plus the mounting of the body on the wheels so that the letter may move vertically relative to each other and relative to the body, whereby the wheels and header follow the side hill slope and the body remains level. Subsidiary problems arise in the transfer of crops from the header to the separating or threshing mechanism in the body, which is conventionally accomplished by a feeder house and conveyor means delivering rearwardly from the header to an inlet opening at the front of the body. In the Long patent, the swivel joint about which the header turns relative to the body is located at the junction of the front of the body and the rear of the feeder house and the feeder house is rigid with the header, the joint involving an annular structure surrounding the crop-transfer path so that crops are fed through the joint and loss of crops by occasional misalinement of the feeder house delivery opening and the body inlet opening is minimized. However, since the feeder house turns with the header, some problems have arisen because of the tendency of the crops to gravitate to the low side of the feeder house. In the Kroll et al. patent, the joint is located at the junction of the header and feeder house and the feeder house does not turn relative to the body. But here, the outer ends of the header "pull in" because they follow arcuate paths, and the swath becomes "wavy."

Both of the above approaches have other deficiencies which, like those noted, occur most frequently in adverse conditions but with sufficient frequency to warrant an improved design such as is achieved in the instant invention, not only as respects the effect of the joint on crop transfer, but also in the structure per se as a header-mounting means. Accordingly, it is an important object of the invention to provide an improved mounting structure in which the swivel or ring joint is located intermediate the body and header by means of a forward extension structure on the body which mounts the rear end of the feeder house as a rigid part of the header. The joint features track means or its equivalent operating in a transverse plane that is inclined upwardly and forwardly, whereby the axis about which the feeder house and header turns relative to the body and extension structure is perpendicular to this plane, or substantially so in various operating conditions, so that the axis inclines forwardly and downwardly, giving improved "following" action to the header.

Other significant objects of the invention reside in the provision of: crop-transfer means in the extension structure; removable cover means for the housing afforded by said structure so that access may be had to the interior thereof; bearing means of the recirculating ball type for mounting a track or ring which in turn carries the feeder house; impoved support means for the driving components of the feeder house conveyor and extension structure crop-transfer means; and such other objects and features as will become apparent as the disclosure of a preferred embodiment of the invention progresses in connection with the accompanying sheets of drawings, the several figures of which are described below.

Fig. 1 is a side view of a typical machine, the near front traction wheel being omitted in order to show the novel mounting means.

Fig. 2 is a front view showing the machine operating on a right-to-left slope.

Fig. 3 is a front view showing the machine operating on a left-to-right slope.

Fig. 4 is a fragmentary longitudinal section on a scale somewhat enlarged over that of Figs. 1–3 and showing the header, feeder house, mounting structure and a forward part of the body.

Fig. 5 is a front view, on the scale of Figs. 1 and 3, showing the machine with the header and feeder house removed.

Figure 6:
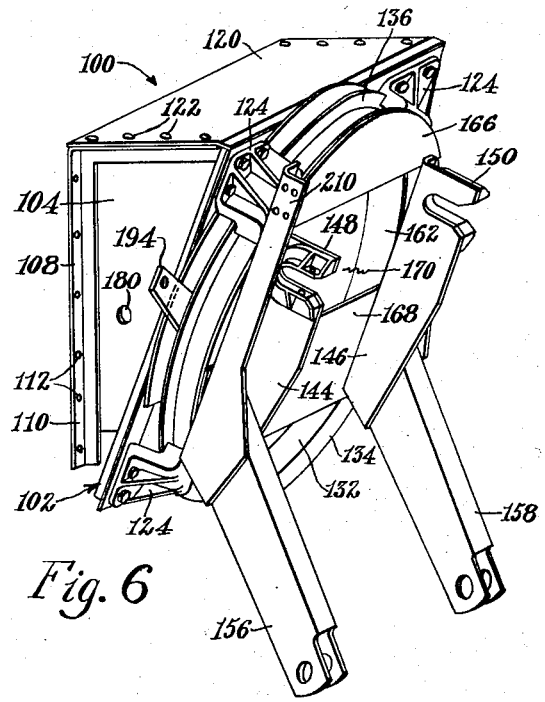
Fig. 6 is an enlarged perspective of the assembled mounting structure.
Figure 8:
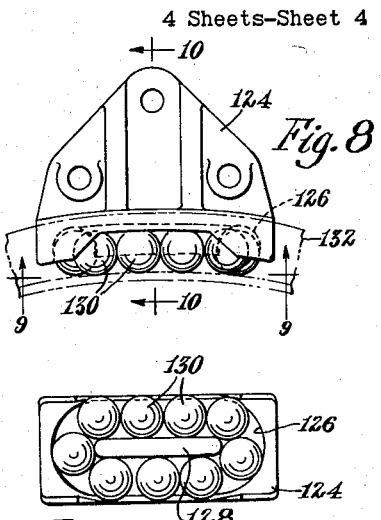
Fig. 8 is an enlarged detail of one of the bearing brackets and associated balls, showing in broken lines the related structure connected and supported thereby.
Figure 9:
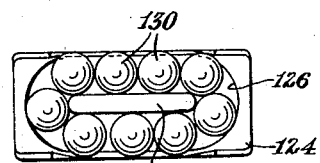
Fig. 9 is a bottom view as seen on the line 9—9 of Fig. 8.
Figure 10:
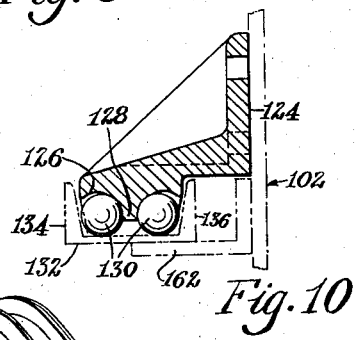
Fig. 10 is a section on the line 10—10 of Fig. 8.

The harvester illustrated has basically the outward appearance of a typical machine of the sidehill combine type, having a fore-and-aft body 20 carried on steerable rear wheel means 22 and right and left front traction wheels 24 and 26. The expressions "right" and "left" are used here with reference to the position of a person standing behind the machine and looking forwardly. The front wheels are cross-connected by articulated axle means 28, here of the parallel link type, and this means is centrally connected to the body so that the wheels may move vertically relative to the body and relative to each other to adapt themselves to sidehill slopes while the body remains level (Figs. 2 and 3). Many examples of similar axles or their equivalents are known in the art and that shown is but representative. Since the details thereof are not important here, elaboration is deemed unnecessary. Also typical of known constructions is the use here of right and left hydraulic cylinders 30 and 32 for positively leveling the body relative to the wheels. The cylinders 30 and 32 are connected respectively to the right and left sides of the body 20 and respectively have piston rods 34 and 36 connected to the right and left ends of the axle means 28. Suitable hydraulic control means (not shown) may be used to extend one cylinder while retracting the other to achieve leveling of the body.

The body has a forwardly located operator's station 38 including a platform 40, seat 42 and steering wheel 44. A grain tank 46 is located behind the operator's station 38 and ahead of an internal combustion engine 48 which serves as a power source for the traction wheels 24 and 26 as well as for the threshing and separating components in the body 20 and for the operating parts of the header and feeder house, as will presently appear. The traction wheels are driven from a variable speed sheave 50 via an engine-driven belt 52 and a sheave-driven belt 54 to a gear box or transmission 56. The U. S. patent to Anderson 2,510,325 shows a typical drive of the character illustrated here.

The body has a transverse upright front end portion 58 generally coincident with the plane of oscillation of the axle means 28 and defines or has therein a forwardly facing crop inlet opening 60 through which crops are delivered to a threshing cylinder 62 and cooperating concave 64. The cylinder is driven by a cross shaft 66 belted at 68 at the right side of the body to a transverse beater or input shaft 70 which carries a pulley 72 at the left side of the body. This pulley is driven by a flat belt 74 from the engine 50.

A transverse header 76, having a cutter bar 78, is positioned ahead of the body and has a trough 80 in which oppositely wound augers 82 and 84 operate to move cut crops laterally inwardly to a central, rearwardly facing crop-outlet opening 86 in a rear wall 88 of the header. A feeder house or spout 90 is rigidly secured to the header in register with the opening 86 and inclines upwardly and rearwardly to a terminal rear end portion 92 which has a crop-delivery outlet or opening 94. Conveyor means 96 operates to move crops over a feeder house floor 98 from the front end of the feeder house to its rear end.

The rear end 92 of the feeder house is spaced a substantial distance forwardly of the front end 58 of the body and the spacing is bridged by extension or mounting structure 100. This structure not only mounts the header-feeder house unit but establishes a housing or tunnel through which crops are transferred from the feeder house delivery outlet 94 to the threshing cylinder 62 via the body opening 60. This housing has a rigid front frame 102 of rectangular shape, to opposite sides of which upright fore-and-afte side walls 104 and 106 are rigidly secured to extend rearwardly for rigid attachment to the front end 58 of the body 20 along opposite sides of the body opening 60. Representative securing or attachment means is achieved by providing an upright angle bar 108 at the rear edge of each side wall, and the flange 110 of the angle bar is apertured at 112 to receive removable fasteners (not shown) which are in turn received by the marginal portions of the front end 58 of the body bordering the opening 60. A rear cross member 114 rigidly cross-connects the rear upper portions of the side walls 104 and 106 and may also be secured to the body. This member is here horizontally coplanar with an upper front cross member 116 that rigidly cross-connects upper front portions of the side walls 104 and 106, serving as well as the top frame member of the frame 102. The tops of the side walls and the members 114 an 116 define a top opening 118 in the housing 100 and this opening is normally closed by a removable top plate or cover 120.

As best seen in Figs. 1 and 4, the operator's platform forwardly overhangs the mounting structure or housing 100 but is spaced sufficiently above that structure to enable removal of the cover 120 for access to the interior of the housing, as for repair, adjustment, cleaning out a clogged condition etc. Fasteners 122 (Fig. 6) of any suitable type are used to retain the cover 120.

Each of the four corners of the frame 102, according to the preferred embodiment, carries bearing means comprising a support or bracket 124 having a pocket 126 at the side thereof that faces radially inwardly to the center of the frame 102. Each pocket has a central island 128 and carries a plurality of recirculating balls 130 by means of which the entire set of bearing means turnably mounts a circular or annular rear mounting element or ring 132, the center of which is here coaxial with the center of the housing structure frame or front mounting face 102. Since the plane of the frame inclines upwardly and forwardly the turning axis of the ring relative to the frame is perpendicular to the plane of the frame; i. e., the axis inclines downwardly and forwardly and preferably lies in the longitudinal median plane of the machine (see line A—A of Fig. 4). The body 20, extension housing 100, feeder house 90, header 76 etc. are normally centered on this median plane.

The ring 132 carries the feeder house, as will presently be described, and thus may be said to establish a rear mounting face or supporting portion for the feeder house. The ring is of channel section having front and rear flanges 134 and 136 in which the recirculating balls 130 ride. Depending upon the direction of turning of the ring 132 relative to the structure 100 and also depending upon the direction of thrust (forwardly or rearwardly) on the ring, the balls 130 will recirculate about the islands 128 in the pockets 126 and will carry the ring and attached feeder house freely and easily with no binding.

Mounting of the feeder house on the front of the ring is established by right and left transversely coaxial trunnion means 138 and 140, and coaxial with these is a cross shaft 142 for the upper end of the feeder house conveyor 96. Right and left plates 144 and 146 are rigidly secured to the ring 132 in laterally spaced apart relation and respectively have forwardly opening slotted portions or receivers 148 and 150 for receiving the trunnions. Retention of each trunnion in its receiver is accomplished by a removable pin 152 (Fig. 1), the structure being the same at both sides.

The housing structure frame 102 affords a front opening 154 in the housing and the ring 132, being open except for means to be presently described, is of course in alinement or register with this opening. The feeder house rear end opening 94 registers with the ring and feeds through the ring and into the housing 100 via the opening 154 and the crop-transfer function is not adversely affected by vertical adjustment or movement of the feeder house and header as a unit about the axis of the trunnion means 138—140. Positive adjustment of the feeder house-header unit is achieved by power-operated devices acting between the ring and the feeder house. For this purpose the ring has rigid thereon right and left depending arms 156 and 158 to the lower end of each of which a hydraulic cylinder and piston assembly 160 is attached, the piston rod in each instance engaging or being suitably connected to a forward portion of the feeder house adjacent to the rear wall 88 of the header. The connecting details are of little importance here and need not be treated further. Suffice it to note that extension and retraction of the cylinders 160 will raise and lower the feeder house and header as a unit about the transverse trunnion means axis, and that unit will also turn about the fore-and-aft axis A—A relative to the body 20 and extension housing 100.

The upper portion of the joint between the frame 102 and ring 132 is sealed against crop loss by an arcuate concentric seal 162 which engages the inner band of the ring 132 (Fig 4), and a transverse ledge member 164 traverses the frame 102 as a lower chord of the seal and defines the bottom of the front opening 154. Upper and lower cross plates 166 and 168 are rigidly secured across the front of the ring and define a rectangular opening 170 in register with the opening 154. The rear transverse terminal edge of the feeder house floor 98 includes a hinged connection 172 to an extension sheet 174 (Fig. 4) which rests loosely on the ledge 164 and assures proper crop transfer from the feeder house rear open end 94 and across the swivel joint 102—132 despite vertical movement of the feeder house about the axis of the trunnion means 138—140.

Since the delivery end 94 of the feeder house 90 is spaced ahead of the body inlet opening 60, means must be provided for improving crop-transfer rearwardly through the extension or bridging housing 100. This means comprises a crop-transfer device or means in the form of a beater 176 of the retractible finger type, carried on a cross shaft 178 having suitable bearings (not shown) supported in the housing side walls 104 and 106 via apertures 180 and 182 respectively. This beater operates over a flexible floor or bottom means plate 184 hinged at 186 on a transverse axis to the ledge member 164 and extending rearwardly to rest on a forward extension plate 188 on the concave 64 (Fig. 4). The purpose of the hinge is to enable the floor plate 184 to move vertically so as to follow the concave when the concave is adjusted toward and away from the cylinder 62. Such concave adjustment is a well known expedient, but the plate 184 is novel.

In order that the header may be compelled to turn about the axis A—A in response to rise and fall of the wheels 24 and 26 rather than seeking its own position, an operative interconnection is made between the wheels and the header, here comprising a link 190 connected at its lower end to the axle means at 192 and connected at its upper end to an ear 194 rigid on the ring 132. The link connections preferably include ball and socket joints to accommodate differences in planes of movement; i. e., the axle means 28 moves in a vertical transverse plane and the ring 132 turns in a transverse sloping plane. The connection details are not specifically important and could be other than those disclosed.

Figure 7:
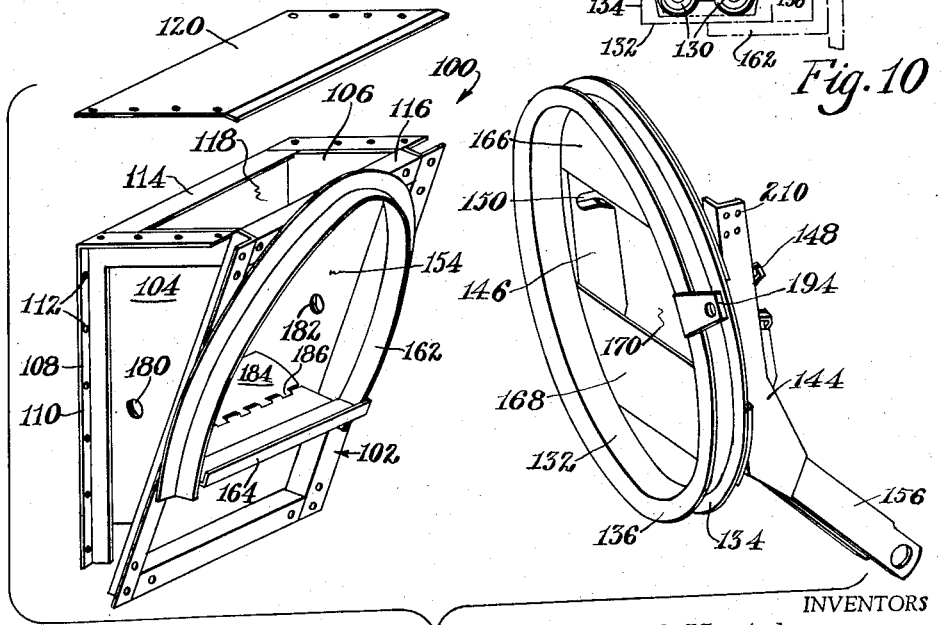
Fig. 7 is an "exploded" perspective of the structure of Fig. 6.

The under left side of the operator's platform 40 carries a support or bearing means 196 in which is journaled a cross shaft 198 drivingly connected by chain and sprocket means 200 to the beater shaft 178. The shaft 198 is belt-driven at 202 from the main beater shaft 70 (Fig. 1), and is connected by telescopic and flexible shaft means 204 to a drive shaft 206 journaled in a bearing or support 208 on the ring 132. Figs. 6 and 7 illustrate part of the support 208 as including an apertured upper portion 210 of the right hand plate means 144. The shaft 206 is chain-connected at 212 to the upper shaft 142 for the feeder house conveyor 96. The support 196 and shaft 198 remain with the body 20 and extension housing 100 as the feeder house and ring turn about the axis A—A, whereas the support 208 and shaft 206 stay with the feeder house. Since those components thus change relative positions, the telescopic shafting 204 is significant. The location of the shaft 142 for the feeder house conveyor on the axis of the trunnion means 138—140 eliminates any change in the drive during vertical movement of the feeder house and header as a unit about the trunnion axis.

The extension housing 100 enables a forward location of the joint 102—132 so that the plane thereof may slope forwardly and upwardly, whereby the axis A—A inclines downwardly and forwardly. This disposition is preferable to a horizontal fore-and-aft axis, because it affords a better pattern of movement of the outer ends of the header 76 as the header is adapted to variations in side hill slopes. This will be clear when it is appreciated that the outer ends of the header move arcuately and hence deviate laterally inwardly from straight lines that they would theoretically follow if the slope remained constant. In the case of a horizontal turning axis in place of the axis A—A, it is found that these ends "pull in" excessively and the swath becomes "wavy." Much if not all of this, at least to an acceptable degree is eliminated by the inclined axis A—A. As shown in Fig. 4, the dotted-line representation of the cutter bar 78 is the normal or average cutting height and the axis A—A intersects the cutter bar at this level. Departures from this level do not materially detract from the advantages of the inclined axis.

In normal operation, the weight of the feeder house and header will create a forward thrust via the rear ring flange 136 on the recirculating balls 130 and the recirculating function occurs as the balls roll from left to right or vice versa, depending upon the direction of turning of the ring 132. When the header encounters a rise in the ground, or some other factor causes a rearward and upward movement thereof, thrust on the balls 130 is created by the front flange 134 of the ring. In either case, the recirculating function is achieved, thus adequately and freely supporting the ring without binding. The balls are easily lubricated and replaced when necessary and the design lends itself admirably to assembly and disassembly.

Combines already in the field or warehouse, etc. may be easily converted to hillside machines by use of the housing structure 100 as a conversion unit. Of course, the converted machine will require a replacement front axle like the means 28.

Features of the invention not specifically set forth are nevertheless embraced in the disclosure and still others will occur to those versed in the art, as will variations in the embodiment shown and described, all of which may be achieved without departure from the spirit and scope of the invention.

What is claimed is:

1. In a hillside harvester having a fore-and-aft body including a forwardly facing crop-inlet opening, and a transverse header disposed ahead of the body and having a rearwardly facing crop-outlet opening, the improvement comprising: fore-and-aft housing means interconnecting the header and body and communicating the header and body openings; and said housing means including a swivel joint substantially normal to the fore-and-aft axis of the housing means enabling pivoting of the header relative to the body about a downwardly and forwardly inclined axis within said housing means.

2. In a hillside harvester having a fore-and-aft body including a forwardly facing crop-inlet opening, and a transverse header disposed ahead of the body and having a rearwardly extending feeder house provided with a rear end spaced ahead of and generally in fore-and-aft alinement with the body opening, the improvement residing in an extension housing for interconnecting the body and feeder house, comprising: a transverse frame intermediate the body opening and the rear end of the feeder house and affording an opening ahead of and in fore-and-aft alinement with the body opening; laterally spaced apart fore-and-aft side walls secured to and extending rearwardly from opposite sides of the frame and secured to the body respectively at opposite sides of the body opening; bottom means extending rearwardly from a lower portion of the frame to a lower portion of the body opening; a top plate extending rearwardly from a top portion of the frame to a top portion of the body opening; a mounting element ahead of and juxtaposed over the frame and having an opening therethrough alined with the opening afforded by said frame; means supporting said element on the frame for turning about a fore-and-aft axis passing through the frame opening; and means supporting the feeder house on said element with the rear end of the feeder house alined with the element opening.

3. The invention defined in claim 2, in which: the frame is inclined forwardly and upwardly and the fore-and-aft axis is generally perpendicular to the plane of said frame.

4. The invention defined in claim 2, including: movable crop-transfer means in the housing for moving crops rearwardly over said bottom means.

5. The invention defined in claim 4, in which: the crop-transfer means includes a beater journaled in said side walls of the housing.

6. The invention defined in claim 2, in which: the top plate is removable for access to the interior of said housing.

7. The invention defined in claim 2, in which: the bottom means comprises a bottom plate hinged in the housing on a transverse axis.

8. The invention defined in claim 2, in which: the frame is rectangular; the mounting element is a circular member having its center on said fore-and-aft axis; and the means supporting said element on the frame includes a plurality of low-friction means, one at each corner of the frame and engaging the circular member.

9. The invention defined in claim 8, in which: each low-friction means comprises a bracket secured to the respective corner of the frame, said bracket having a pocket facing radially inwardly as respects said fore-and-aft axis, and a plurality of balls in said pocket and engaging the circular member.

10. The invention defined in claim 2, in which: the mounting element is a circular track having its center on said fore-and-aft axis; and the means supporting said element on the frame includes a plurality of bearings of the recirculating ball type mounted on the frame and spaced angularly about the circular track.

11. In a hillside harvester having a fore-and-aft body provided with a forward facing crop-inlet opening, an operator's station on the body including a platform part forwardly overhanging the crop-inlet opening, and a transverse header disposed ahead of the body and having rigid therewith a rearwardly extending feeder house provided with an open rear end spaced forwardly of and in fore-and-aft alinement with the body opening, the improvement residing in structure intervening between the body opening and the open rear end of the feeder house, comprising: a supporting housing rigidly secured to the body in register with the body opening and extending forwardly therefrom below the operator's station platform and into proximity to the rear end of the feeder house, said housing having an open front end in communication with the open rear end of the feeder house; means interconnecting the front end of the housing and the rear end of the feeder house for turning of the latter relative to the former on a fore-and-aft axis through said open front end of the housing; conveyor means in the feeder house for moving crops rearwardly into the housing; movable crop-transfer means in the housing for moving such crops rearwardly through the body opening; a first shaft journaled on the operator's station platform and drivingly connected to the crop-transfer means; a second shaft movable with the feeder house when said feeder house turns relative to the housing and said second shaft being drivingly connected to the conveyor means; and flexible and telescopic shaft means drivingly interconnecting said shafts.

12. The invention defined in claim 11, in which: the housing has a top plate spaced below and directly beneath the platform, and said plate is removably secured to the housing to enable access to the interior of said housing from above.

13. In a hillside harvester having a fore-and-aft body including a transverse upright front end provided with a crop-inlet opening, and a transverse header ahead of the body and including a rigid feeder house extending rearwardly and having a transverse terminal open rear portion lying in a forwardly and upwardly inclined plane ahead of the front end of the body, the improvement comprising: wedge-shaped supporting structure having a transverse rear upright face portion rigidly attached to the front end of the body over said body opening and a front transverse face parallel to and adjoining the terminal rear portion of the feeder house, said rear face having an opening therein communicating with the body opening, said front face having an opening communicating with the open rear end of the feeder house and said supporting structure being hollow to enable crop-transfer therethrough from the feeder house to the body via said openings; and means mounting the terminal rear portion of the feeder house on said front face for relative turning about a fore-and-aft axis normal to said plane and passing through said front face.

14. The invention defined in claim 13, in which: the terminal rear portion of the feeder house includes an annular track having its center on said axis, and said front face includes concentric seal means cooperative with the track to minimize crop loss between the track and said front face.

15. In a hillside harvester having a fore-and-aft body including a forwardly facing crop-inlet opening, and a transverse header disposed ahead of the body and having a rearwardly facing crop-outlet opening, the improvement comprising: an extension housing rigidly secured to the body in register with the crop-inlet opening and extending forwardly therefrom to a front mounting portion short of the header, said mounting portion having a forwardly facing opening; a feeder house rigidly secured to the header in register with the crop-outlet opening and extending rearwardly therefrom to a rear mounting portion juxtaposed with the extension housing mounting portion, said feeder house mounting portion having a rearwardly facing opening alined with the extension housing opening; and means pivotally interconnecting the mounting portions on a fore-and-aft axis passing through the mounting portion openings, and said mounting portions lying generally in a transverse plane that inclines upwardly and forwardly and said axis being generally perpendicular to said plane.

16. In a hillside harvester having a fore-and-aft body including a forwardly facing crop-inlet opening, and a transverse header disposed ahead of the body and having a rearwardly facing crop-outlet opening, the improvement comprising: an extension housing rigidly secured to the body in register with the crop-inlet opening and extending forwardly therefrom to a front mounting portion short of the header and lying in a plane that inclines upwardly and forwardly, said mounting portion having a forwardly facing opening; a mounting element having a crop-transfer opening therethrough in register with the mounting portion opening and supported on the mounting portion for turning about a fore-and-aft axis through said mounting portion opening and generally perpendicular to the aforesaid plane; a feeder house rigidly secured to the header in register with the crop-outlet opening and extending rearwardly therefrom to a rear open end proximate to said mounting element; transverse pivot means connecting the rear end of the feeder housing to the mounting element and mounting the feeder house for turning with said element about said fore-and-aft axis and enabling vertical movement of said feeder house and header relative to said element; and means connected between said element and feeder house for positively moving the feeder house vertically relative to said element.

17. In a hillside harvester having a fore-and-aft body including a forwardly facing crop-inlet opening, and a transverse header disposed ahead of the body and having a rearwardly extending feeder house provided with a rear end spaced ahead of and having a rear crop outlet opening generally in fore-and-aft alinement with the body opening, the improvement residing in means for interconnecting the body and feeder house, comprising: a transverse support adjacent to the rear end of the feeder house and affording an opening generally in fore-and-aft register with the feeder house rear end opening; wall means bordering the support opening and secured to and extending rearwardly from the support and secured to the body in bordering relation to the body opening and affording passage means communicating the feeder house rear end opening and said body opening; a mounting element ahead of and juxtaposed over the support and having an opening therethrough alined with the opening afforded by said support; means supporting said element on the support for turning about a downwardly and forwardly inclined axis passing through said support opening; and means lying in a plane substantially normal to said axis and supporting the feeder house on said element with the rear end opening of the feeder house alined with the element opening.

References Cited in the file of this patent
UNITED STATES PATENTS 2,750,728     Bailey _____ June 19, 1956
2,780,903     Kroll et al. _____ Feb. 12, 1957